United States Patent [19]

Henry

[11] Patent Number: 5,174,906
[45] Date of Patent: Dec. 29, 1992

[54] FLUSHING OF HEATING, VENTILATING AND AIR CONDITIONING SYSTEMS USING ENVIRONMENTALLY SAFE MATERIALS

[75] Inventor: Richard G. Henry, Mayfield Heights, Ohio

[73] Assignee: Advanced Research Technologies, Park Ridge, Ill.

[21] Appl. No.: 766,124

[22] Filed: Sep. 27, 1991

[51] Int. Cl.$^5$ ................................................. C02F 1/68
[52] U.S. Cl. ..................................... 210/765; 210/749; 210/805; 62/292; 62/303; 134/22.11; 134/22.19; 252/67
[58] Field of Search ............... 210/805, 804, 749, 765; 62/303, 292, 77, 85; 252/67, 68; 134/22.11, 22.19, 108

[56] References Cited

U.S. PATENT DOCUMENTS

| | | | |
|---|---|---|---|
| 4,887,435 | 12/1989 | Anderson, Jr. | 62/292 |
| 4,934,390 | 6/1990 | Sapp | 62/303 |
| 5,025,633 | 6/1991 | Furmanek | 62/292 |
| 5,036,675 | 8/1991 | Anderson, Jr. | 62/292 |

Primary Examiner—Robert A. Dawson
Assistant Examiner—Ana M. Fortuna
Attorney, Agent, or Firm—Robert J. Black

[57] ABSTRACT

A solvent selected from the terpene hydrocarbon group and terpene alcohol group as a cleaning agent can provide effective cleaning of heating, ventilating and air conditioning systems which use hydrofluorocarbon or hydrochlorofluorocarbon or Freon refrigerants by using a solvent as described. Flushing through the refrigerant system condenser coils and evaporation coils removes any trace of excessive compressor lubricant which will be carried out with the solvent. The flushed materials carried out are biodegradable, thus are desirable from an environmental standpoint.

11 Claims, No Drawings

FLUSHING OF HEATING, VENTILATING AND AIR CONDITIONING SYSTEMS USING ENVIRONMENTALLY SAFE MATERIALS

BACKGROUND OF THE INVENTION

1. Field of the Invention

The present invention relates to the effective flushing of heating, ventilating and air conditioning systems and more particularly to cleaning of such systems which utilize hydrofluorocarbon and hydrochlorofluorocarbon or Freon refrigerants by the use of solvents selected from the terpene alcohol and terpene hydrocarbon group as a cleaning aid.

2. Background Art

Because of the damage that Freon (CFC) refrigerants were doing to the ozone layer, it has become necessary for the development of alternative refrigerants which are more environmentally friendly. Dupont and International Chemicals are two such companies who developed hydrofluorocarbon and hydrochlorofluorocarbon refrigerants, both of which are much safer to the environment and have an ozone depletion factor of one rather than an ozone depletion factor of 8.0, as is found for Freon refrigerants.

With the advent of such new refrigerants came new problems associated with their use. One particular problem is that of cleaning of heating, ventilating and air conditioning systems employing these new refrigerants. When existing systems changed over to the new hydrofluorocarbon and hydrochlorofluorocarbon refrigerants from the Freon type refrigerants, it was crucial and absolutely essential that all of the Freon refrigerant by complete completely removed before recharging the system with the new refrigerant. Any trace of the old refrigerant which is left beyond will cause catastrophic failure of the compressor system. Thus, it becomes extremely necessary to have proper flushing out of these materials. Previously, Freon liquids were used to clean heating, ventilating and air conditioning systems but were later determined to have unacceptable side effects in that such cleaners evaporate quickly but are very destructive to the ozone layer.

Subsequently, Allied Chemical Company developed a flushing solvent called "Genesolve" which is an hydrochlorofluorocarbon liquid that was intended as an ozone safe compressor system flushant. The hydrochlorofluorocarbon liquid is much safer to the ozone layer but has some serious drawbacks that render it unacceptable for use as a compressor system flushant. These objections include the extremely powerful solvent ability of the hydrochlorofluorocarbon liquid. As such, it will attack the gasket materials in any devices used to inject the flushant into the compressor system. It also acts as to attack the gasket materials utilized in the refrigerant compressor itself. The hydrochlorofluorocarbon liquid attacks even the most chemically resistant gasket materials such as fluoroelastomers, neoprene and butadiene.

Other solvents, which were experimented with for use as a flushant, such as isoppropyl/acetone mixtures are extremely flammable and non-biodegradable, thus making them unacceptable for use as a cleaning aid. Petroleum distillates on the other hand, such as mineral spirits, do not evaporate quickly enough and are generally very flammable and therefore also dangerous to use.

SUMMARY OF THE INVENTION

When it becomes necessary to recharge a compressor system of a heating, ventilating and/or air conditioning system, it is required that an appropriate flushant solvent be used with a circulating pump to remove excess glycol/ester or petroleum lubricant which may remain behind as well as any refrigerant. Dipentene and D-limonene are solvents that are capable of cleaning out any excess lubricant because of their excellent solvent ability and their affinity for hydrofluorocarbon and hydrochlorofluorocarbon and/or Freon refrigerants.

Normally the circulation of these new solvents through the evaporator coils, condenser coils, and refrigeration compressor systems will clean and degrease these areas and reduce pollution by using degradable materials for the flushing.

An important feature of the use of Dipentene is its relatively high flash point of 142 degrees Fahrenheit (open cup). While this is not as good as Freon or hydrochlorofluorocarbon solvents which are non-flammable, it is sufficiently good so as to allow for safe handling. Most other non-halogenated flushants have much lower flash points such as that of acetone-isopropyl alcohol mixtures which typically have flash points of 15 degrees Fahrenheit (open cup) which make them unacceptable for safe usage for this purpose. Dipentene has an evaporation rate of 0.10 (while water is 1). This extremely low evaporation for Dipentene allows for low inhalation danger to the user. Dipentene also evaporates leaving no residue behind thus leaving the compressor system completely clean and ready for a recharge of appropriate refrigerant.

It has also been determined that cyclohexanone has a dielectric strength of 42.5 KV, or 42,500 volts, which makes it a safe solvent to use around electrical equipment. Because of this extremely high dielectric value, it is unlikely that a flashover will occur in most situations.

Because of Dipentene's structural characteristics, namely its cycloaliphatic structure with one double bond, it becomes attackable by bacteria found in nature and therefore the product is bidodegradable. Unlike most aromatic ring structures, such as benzene, which are very stable and therefore resistant to biodegradation.

Another important property of a flushant is the way in which it attacks or for that matter does not attack gaskets and O-rings found in compressor systems. Dipentene and D-limonene have the ability to dissolve the lubricants, moisture and refrigerant but do not dissolve most gasket materials as demonstrated in the following chart:

| SWELL INDEX FOR VARIOUS GASKET MATERIALS USING NEW SOLVENTS | | |
|---|---|---|
| | D-LIMONENE % SWELL | DIPENTENE % SWELL |
| NEOPRENE | 0.0 | 0.0. |
| BUTADIENE | 0.0 | 0.2 |
| ISOPRENE-NATURAL RUBBER | DISSOLVED | DISSOLVED |
| BUTACLOR | 0.0 | 0.0 |
| ETHYLENEPROPYLENE-DIAMINE MONOMER | 2.5 | 1.7 |
| HYCAR | 0.0 | 0.0 |
| NITRILE | 0.0 | 0.0 |
| TEFLON | 0.0 | 0.0 |
| HEXAFLUOROPROPYLENE VINYLDIENE | 0.0 | 0.0 |

-continued

SWELL INDEX FOR VARIOUS GASKET MATERIALS
USING NEW SOLVENTS

| | D-LIMONENE % SWELL | DIPENTENE % SWELL |
|---|---|---|
| FLUORIDE | | |

Dipentene has a Kauri-butanol value of 67-70 and is a powerful solvent for mineral oil and polyglycols and has excellent biodegradability, thus making it usable in this process. The evaporation rate of terpene alcohols and terpene hydrocarbons can be enhanced by the addition of a lower boiling point ketones. Ketones also have excellent solubility in polyglycol lubricants which further enhances the cleaning of the lubricant from the refrigeration system.

DESCRIPTION OF THE PREFERRED EMBODIMENT

To utilize the solvents described in the foregoing summary, an injection system must be utilized which can push the solvent through system under pressure. A simple electric recirculating pump capable of pumping a gallon of liquid a minute is utilized to push the solvent through the evaporator coils and condensor coils as well as the compressor chamber of the heating, ventilating, air conditioning system. One gallon of Dipentene or D-limonene should be used to fill the pump reservoir. An injector nozzle, which may be fitted into the compressor lubricant reservoir is utilized to push the fluid through the system and the solvent can be collected at a discharge port at the end of the refrigeration circuit loop. After the solvent is pushed through the system, it is collected and returned to the pump reservoir what is then recirculated through the system until a satisfactory cleaning of all refrigerant and compressor oil and moisture. It has been found that typically operating the recirculating pump for five to ten minutes will remove all the contaminants from the system leaving it clean and ready for recharging with new refrigerant. The spent solvent may then be discarded and of course because of its biodegradability will be attacked by bacteria and the environment will not harm the ozone layer.

A solvent selected from the terpene hydrocarbon group and terpene alcohol group with best results obtained by utilizing Dipentene or D-limonene as a refrigerant flushant because it contains the following characteristics for proper cleaning of a heating, ventilating, air conditioning compressor system which uses Freon refrigerant or hydrochlorofluorocarbon or hydrofluorocarbon as a refrigerant.

The characteristics of such solvent must be they must have good solubility in glycol, ester, and petroleum based lubricants, as well as good solubility in the above described refrigerants. It must also have a 0.2-1% solubility in water, a flash point above 100 degrees Fahrenheit, it should not attack or dissolve synthetic gasket materials, and should also have a dielectric strength of at least 20,000 volts. The product should also have an evaporation rate of at least 0.10. On evaporation it should leave no residue to clog the system pumping mechanism. It should also contain no halogens, and be easily degraded by bacteria in the environment.

To properly utilize the D-limonene or Dipentene as a solvent as described, a simple electric recirculating pump should be used to provide the necessary pressure for the system. The system should be capable of pumping approximately one gallon of liquid a minute to adequate circulate the solvent through the evaporator coils, condensor coils as well as the compressor chamber of the system to be cleaned. To practice the process, place a gallon of mixture as outlined below in the pump reservoir. This is followed by placing an injector nozzle on the solvent output hose, attaching the injector nozzle at the refrigerant input valve, attach an output hose to the discharge port at the end of the refrigeration circuit loop, operate the pump at a flow rate of one gallon per minute, and allow the solvent blend to flow through the refrigeration system, including the evaporator coils and the condensor coils for 15°20 minutes while allowing the solvent to return to the pump reservoir. As soon as the solvent has been circulated through the system for the appropriate amount of time, the reservoir is emptied of solvent. Air is then blown through the system for three to five minutes to evaporate excess solvent from the system. The solvent is disposed of in a landfill where it will be degraded by bacteria within 28 days and thus will not be harmful to the environment. Several forms of the solvent that may be used in the above described system are the following examples:

1) a solvent containing a 50:50 blend of D-limonene and Dipentene.
2) a solvent containing 100% Dipentene.
3) a solvent containing a 50:50 blend of D-limonene and terpinolene.
4) a solvent containing an 80:20 blend of Dipentene and acetone.
5) a solvent containing a 50:50 blend of D-limonene and para-cymene.
6) a solvent blend of 20-90% para-menthadienes (Dipentene) and terpene alcohols.
7) a solvent containing 100% para-cymene.

While but only selected embodiments of the present invention have been disclosed herein, it will be obvious to those skilled in the art that numerous modifications may be made without departing from the spirit of the present invention which shall be limited only by the scope of the claims appended hereto.

What is claimed is:

1. The process of flushing refrigerant from heating, ventilating and air conditioning systems that employ Freon, hydrofluorocarbon or hydrofluorochlorocarbon as a refrigerant, comprising the steps of:
   preparing a solvent consisting of a mixture of materials selected from the terpene hydrocarbon group and the terpene alcohol group;
   placing the solvent mixture in the reservoir of a recirculating pump;
   connecting an output of said pump to an input of a system to be flushed;
   connecting an output of said system to said recirculating pump reservoir;
   operating said pump for a predetermined period of time;
   circulating the solvent through said system to cleanse said system;
   terminating operation of said pump;
   draining all the solvent and refrigerant and other materials contained within said system into said reservoir;
   blowing air through said system to evaporate any of said solvent remaining in said system.

2. The process as claimed in claim 1 wherein: said solvent contains a 50:50 blend of D-limonene and Dipentene.

3. The process as claimed in claim 1 wherein:
said solvent contains 100% Dipentene.

4. The process as claimed in claim 1 wherein:
said solvent contains a 50:50 blend of D-limonene and terpinolene.

5. The process as claimed in claim 1 wherein:
said solvent contains an 80:20 blend of Dipentene and acetone.

6. The process as claimed in claim 1 wherein:
said solvent contains a 50:50 blend of D-limonene and para-cymene.

7. The process as claimed in claim 1 wherein:
said blowing step is followed by:
emptying said reservoir;
and disposing of said solvent and said refrigerant.

8. The process as claimed in claim 7 wherein:
said disposal step is followed by disposal of said solvent and refrigerant flushed from said system into a land fill to facilitate biodegradability of said disposed materials.

9. The process as claimed in claim 1 wherein:
said recirculating pump operates to pump approximately one gallon of solvent through said system per minute.

10. The process as claimed in claim 1 wherein:
said solvent is pumped through said system for a period from 12 to 24 minutes.

11. The process as claimed in claim 1 wherein:
said blowing of air through said system is for a period of three to five minutes.

* * * * *